United States Patent Office 3,841,954
Patented Oct. 15, 1974

3,841,954
COMPRESSED RIGID LAMINATED MATERIAL INCLUDING STITCHING REINFORCEMENT
Harry A. Lawler, Youngstown, N.Y., assignor to The Carborundum Company, Niagara Falls, N.Y.
Original application Mar. 15, 1971, Ser. No. 124,079, now Patent No. 3,719,545. Divided and this application Dec. 4, 1972, Ser. No. 311,607
Int. Cl. B32b 7/08, 27/08; B29c 27/00
U.S. Cl. 161—50                                5 Claims

ABSTRACT OF THE DISCLOSURE

A liminated material made up of densified layers of flexible material such as films or fabrics. The flexible layers are stitched together with reinforcing filaments and then desified under heat and pressure to form a compressed rigid laminate which is suitable as a backing for personnel armor.

---

This is a division of copending application Ser. No. 124,079, filed Mar. 15, 1971, now Pat. No. 3,719,545.

BACKGROUND OF THE INVENTION

During the past few years, the use of armor for body protection during hazardous situations has increased. This has brought about a need for lightweight protective armor which has been manufactured from high strength metals or hard ceramic materials such as aluminum oxide or carbides of boron or silicon. These materials have generally been effective, when employed in conjunction with suitable backing materials which retard projectile fragment penetration by deformation or controlled delamination of the backing layer. The hard facing material of the armor absorbs the initial shock of a projectile and fragments the core, however, penetration may still take place. The function of the backing material is to absorb the remainder of the projectile energy with minimum harm to the wearer of the armor. If the backing is a laminated material, the force of the projectile may cause excessive separation of the laminations, weakening the inner structure of the armor and greatly reducing its effectiveness, particularly on subsequent impacts. It is therefore an object of this invention to provide a reinforced material which will resist delamination when struck by a projectile, the material then functions to absorb and dissipate the projectile energy.

Another object of this invention is to provide a reinforced material that will retain its strength while being shaping into forms suitable as a backing for contoured personnel armor.

A further object of this invention is to provide a reinforced material that may be used without an armor facing for protection against lesser ballistic threats such as fragmentation projectiles.

SUMMARY OF THE INVENTION

Briefly, the invention provides a laminated material comprised of multiple layers of film or fabric and stitched together in a suitable pattern with a reinforcing filament. The reinforcing stitching strengthens the laminate layers, enabling them to resist separation when struck by projectiles or projectile fragments. The reinforced layers are then heated and compressed to form a densified rigid laminate which may be shaped to form a projectile resistant backing for personnel armor.

DESCRIPTION OF PREFERRED EMBODIMENTS

Figure 1:
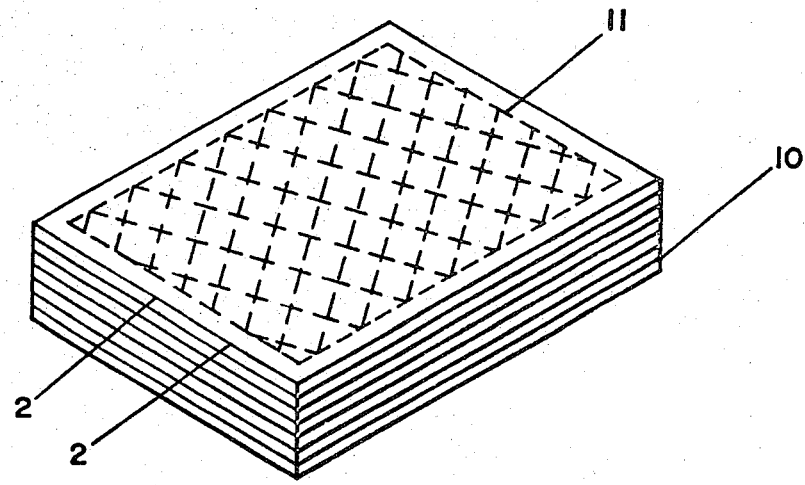
FIG. 1 shows a prespective view of a piece of the laminated material of this invention, prior to heating and compression into the densified form.
Figure 2:
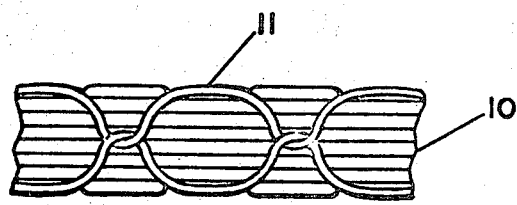
FIG. 2 is a sectional view of the same piece, taken along the lines 2—2 of FIG. 1.
Figure 3:
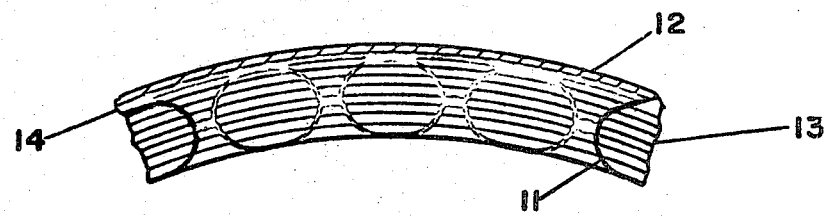
FIG. 3 is a sectional view of a piece of personnel armor showing the attachment of the densified laminate to the back of the armor facing.

A preferred embodiment of the laminated material of this invention is shown in FIG. 1 The laminate is formed from multiple layers of a fabric woven from polypropylene filaments 10. The cloth layers are then stitched together, using a heat shrinkable filament 11, such as cold oriented polyethylene. Stitching is preferably done in a quilting pattern, but may also be done only around the periphery of the material or in one or more spots with a button stitch. Subsequent to stitching, the relatively flexible laminate is compressed under a pressure of 600 p.s.i. while being heated to 250° F. for a period of one hour. A hard, rigid laminate is formed in which the layers are held together primarily by the stitching which runs essentially perpendicular to the layers and which is compressed into the structure, Simultaneously with the compression, the laminate is shaped to fit the contours of the armor facing. A sectional view of a piece of personnel armor is shown in FIG. 3, in which the densified laminate 13 is shown attached to the armor facing 12. The laminate is bonded to the back of the armor facing by means of a layer of polyurethane or polysulfide adhesive 14.

The material of the invention is used primarily as a relatively lightweight backing to lend strength and limited resilience to contoured personnel armor. The material is preferably formed from films or woven fabrics of heat softenable polymeric materials such as polypropylene, polyethylene, polytetrafluoroethylene, polyamide or polyvinylchloride. However, flexible and resilient materials such as non-woven webs, polymeric films, or non-woven fabrics of natural or synthetic fibers may also be employed. Other types of materials may be resin impregnated fabrics, woven or non-woven made from inorganic fibers such as glass or aluminum silicate or from natural or synthetic fibers which are not heat softenable.

The reinforcing filaments used for stitching may comprise any one of the natural or synthetic fibers or blends. Cold-oriented filaments which contract upon heating are preferred. Such filaments provide a stronger reinforcement when the stitched laminate is densified under heat and pressure. Metallic fibers are suitable for reinforcement stitching, as well as filaments consisting of blends of synthetic or natural fibers reinforced with metallic fibers.

While the material of this invention is preferably formed under a pressure of 600 p.s.i. and a temperature of 250° F. for a period of one hour, variations in processing conditions may require pressures ranging from 100 to 1000 p.s.i., with temperatures ranging from 200 to 300° F. and time periods ranging from 30 minutes up to two hours.

The materials according to the present invention are primarily employed as a backing material for personnel armor which may be worn by police or like personnel engaged in hazardous situations. The materials may also be used without an armor facing for protection against lesser ballistic threats, such as those caused by various fragmentation devices, The materials are also suitable as backing to metallic or refractory facing for the enclosure of dangerous industrial operations which present an explosion hazard.

It is to be understood that many equivalent modifications will be apparent to those skilled in the art from the reading of the foregoing disclosure, without a departure from the intended concept of the invention.

What is claimed is:
1. A compressed rigid laminated material comprising multiple layers of initially flexible material and including stitching reinforcement with a heat shrunk filament, the layers of said flexible material having been compressed and rigidified, said rigid laminated material being reinforced and held in compression by said heat shrunk stitching.

2. A compressed rigid laminated material according to claim 1 wherein said flexible material comprises polymeric materials selected from the group consisting of polyproylene, polyethylene, polytetrafluoroethylene, polyamide and polyvinyl chloride.

3. A compressed rigid laminated material according to claim 1 wherein said flexible material comprises inorganic fibers selected from the group consisting of glass and aluminum silicate.

4. A compressed rigid laminated material according to claim 1 wherein said heat-shrunk filament is cold oriented polyethylene.

5. A compressed rigid laminated material according to claim 1, said material having been shaped into a contoured form of rigid laminate, suitable for armor backing.

References Cited
UNITED STATES PATENTS

| | | | |
|---|---|---|---|
| 2,789,076 | 4/1957 | Frieder et al. | 161—404 X |
| 1,337,993 | 4/1920 | Bird | 161—50 |
| 2,960,424 | 11/1960 | Bjorholm | 161—404 UX |
| 2,920,008 | 1/1960 | Frieder et al. | 161—50 |

PHILIP DIER, Primary Examiner

U.S. Cl. X.R.

89—36; 156—85; 161—203, 92, 252, 404